G. L. COLLINS.
EMERGENCY OPERATING DEVICE FOR AIR BRAKES.
APPLICATION FILED MAY 22, 1912.
1,045,260.
Patented Nov. 26, 1912.
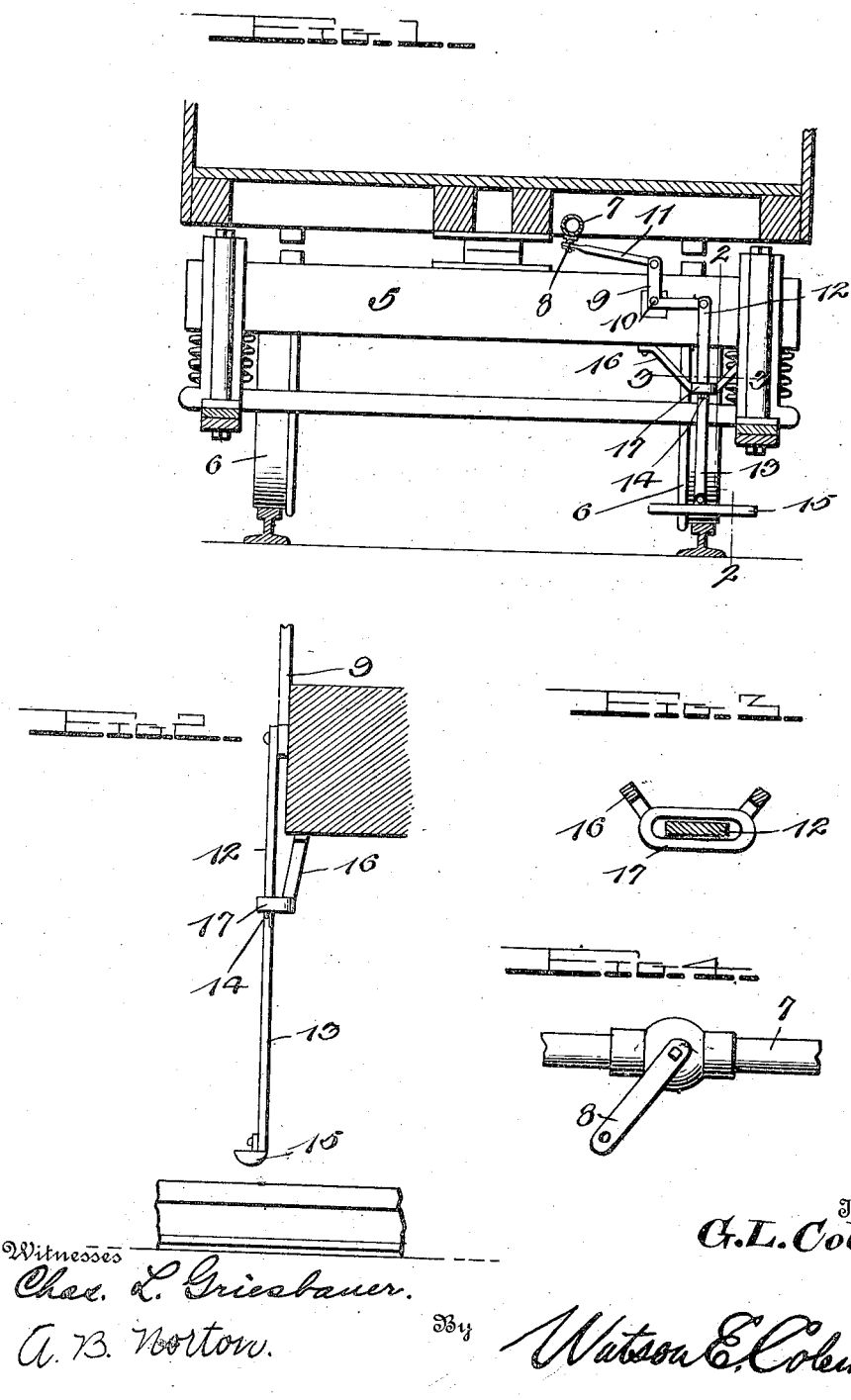
Witnesses
Chas. L. Griesbauer.
A. B. Norton.
Inventor
G. L. Collins,
By Watson E. Coleman,
Attorney

UNITED STATES PATENT OFFICE.

GEORGE L. COLLINS, OF HICKMAN, KENTUCKY.

EMERGENCY OPERATING DEVICE FOR AIR-BRAKES.

1,045,260.

Specification of Letters Patent. Patented Nov. 26, 1912.

Application filed May 22, 1912. Serial No. 699,041.

*To all whom it may concern:*

Be it known that I, GEORGE L. COLLINS, a citizen of the United States, residing at Hickman, in the county of Fulton and State of Kentucky, have invented certain new and useful Improvements in Emergency Operating Devices for Air-Brakes, of which the following is a specification, reference being had to the accompanying drawings.

This invention relates to emergency air brake operating devices and has for its primary object to provide simple, efficient and positively acting means to release the air from the train line pipe when the trucks are derailed.

A more specific object of the invention resides in the provision of a bell crank lever mounted upon the car truck and connected to the lever of a valve in the train line pipe, a depending bar pivotally connected to said lever and consisting of two sections hingedly connected together, the lower section carrying a shoe disposed in juxtaposition to the tread of the rail and adapted to engage therewith when the truck leaves the rails, and means to guide said lower section and hold the same against movement relative to the other section of said bar when the bar is forced upwardly to open the valve.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing in which—

Figure 1 is a cross section of a car showing my improved emergency brake operating means mounted upon the truck thereof; Fig. 2 is a section taken on the line 2—2 of Fig. 1. Fig. 3 is a section taken on the line 3—3 of Fig. 1. Fig. 4 is a detail view of the releasing valve and operating lever therefor.

Corresponding and like parts are referred to in the following description and designated in the accompanying drawing by like reference characters.

Referring in detail to the drawing 5 designates the truck of a car including the wheels 6. My improved emergency air brake valve operating device to be hereinafter specifically described is mounted upon the truck frame beneath each end of the car body. The usual longitudinally extending air line pipe 7 is mounted beneath the body of the car in any preferred manner and in the same a valve is arranged, said valve being provided with an operating lever 8.

Upon the transverse beam of the truck frame between the pair of truck wheels, a bell crank lever 9 is fulcrumed as shown at 10 upon a suitable bearing plate secured to said beam. A connecting bar 11 is pivotally connected to one end of this bell crank lever and is similarly connected to the end of the valve operating lever 8. To the other end of the bell crank lever 9 a depending bar is connected, said bar consisting of upper and lower sections 12 and 13 respectively hingedly connected together as at 14. The upper section 12 of this bar is connected to the lever 9 while to the end of the lower section 13 a cross bar 15 is secured, said bar extending transversely of the track rail and being normally disposed contiguous to the tread surface thereof. The major portion of this transversely disposed bar or shoe is disposed in advance of the bar section 13 and normally acts to hold said bar sections by gravity in longitudinal alinement with the other section 12 of the bar.

To the truck beam the ends of a rod or bar 16 are secured. From the fixed ends of the bar the same is inclined downwardly and convergently disposed, the intermediate portion of said bar or rod being in the form of a loop indicated at 17. Through this loop the bar section 12 is loosely disposed in the normal position of the shoe 15. As will be seen from reference to Fig. 2 of the drawing, the lower bar section 13 is capable of swinging movement only in one direction, the upper section of the bar being provided with a suitable stop to prevent the forward swinging movement of the section 13. Thus in the event that the transversely disposed shoe 15 should strike an obstruction in the track, the same may be moved rearwardly without operating the air brake. As soon as the shoe passes over the obstruction, the same will immediately return to its normal position.

From the above description, the manner of operation of the device will be readily understood. In the event that the train should become derailed, the transversely disposed shoe 15 thereof will immediately engage with the rails and force the lower section of the bar 13 upwardly through the loop 17 thereby oscillating the lever 9 upon its fulcrum and moving the connecting bar 11 to open the valve in the train line pipe so that the brakes will be immediately applied. The shoe 15 is preferably provided with a convex lower surface and the hinge 14 connecting the bar sections 12 and 13 is normally disposed immediately below the plane of the loop 17. Thus as soon as the shoe 15 strikes the rail, the hinge 14 will be disposed through said loop and the swinging movement of the lower bar sections 13 is prevented so that said bar section and the upper section 12 will be forced upwardly to effect the opening of the air valve. In the above manner the brakes will be automatically applied as soon as the train leaves the rails and the wrecking of the train and liability of serious injury to the passengers thus obviated.

While I have above described and shown in the accompanying drawing the preferred construction and arrangement of the various elements employed, it will be obvious that the invention is susceptible of many minor modifications without departing from the essential features or sacrificing any of the advantages thereof.

Having thus described the invention, what is claimed is:

1. The combination with a car truck and air line pipe having a valve therein and an operating lever for the same, of actuating means mounted upon the track and connected to said lever, said means including a vertically movable bar formed in two sections hingedly connected together, a transversely disposed shoe on the lower bar section disposed contiguous to the track rail, said lower section of the bar in the normal position thereof being free to swing in one direction, and means mounted upon the truck adjacent to which the hinge connecting the bar sections is normally disposed, the lower bar section being guided in its upward movement and held against swinging movement by said last referred to means when the shoe engages the track rail.

2. The combination with a car truck and air line pipe having a valve therein and an operating lever therefor, of actuating means for said valve connected to the lever, said operating means including a vertically movable bar formed in two sections hingedly connected together, a shoe fixed to the lower section of said bar and extending transversely of the rail, a guide rod fixed at its ends to the truck and having an intermediate loop through which the sections of said bar are adapted to move, the hinge connecting the bar sections being normally disposed immediately below the plane of said loop to permit of the free swinging movement of the shoe in one direction, the engagement of said shoe with the track rail forcing the lower bar section upwardly through the loop whereby such swinging movement of the shoe is prevented.

In testimony whereof I hereunto affix my signature in the presence of two witnesses.

GEORGE L. COLLINS.

Witnesses:
PAFF HAWKINS,
W. O. McMILLAN.